(12) United States Patent
Kim et al.

(10) Patent No.: US 7,119,141 B2
(45) Date of Patent: Oct. 10, 2006

(54) POLYESTER MOLDING COMPOSITION

(75) Inventors: Sung Dug Kim, Evansville, IN (US); Robert Russell Gallucci, Mt. Vernon, IN (US); Sanjay Braj Mishra, Evansville, IN (US)

(73) Assignee: General Electric Company, Schenectady, NY (US)

( * ) Notice: Subject to any disclaimer, the term of this patent is extended or adjusted under 35 U.S.C. 154(b) by 242 days.

(21) Appl. No.: 10/644,640

(22) Filed: Aug. 20, 2003

(65) Prior Publication Data

US 2005/0043483 A1    Feb. 24, 2005

(51) Int. Cl.
*C08L 67/02* (2006.01)
*C08L 33/06* (2006.01)
*C08K 5/52* (2006.01)
*C08K 5/36* (2006.01)
*C08K 5/13* (2006.01)

(52) U.S. Cl. ............... 524/513; 524/128; 524/133; 524/155; 524/323; 524/504; 525/64; 525/65; 525/176

(58) Field of Classification Search ............... 524/504, 524/513, 128, 133, 155, 323; 525/64, 65, 525/176
See application file for complete search history.

(56) References Cited

U.S. PATENT DOCUMENTS

| | | | |
|---|---|---|---|
| 3,193,522 A | 7/1965 | Neumann et al. | |
| 3,405,198 A | 10/1968 | Rein et al. | |
| 3,769,260 A | 10/1973 | Segal | |
| 3,864,428 A | 2/1975 | Nakamura et al. | |
| 4,075,163 A | 2/1978 | Hofer et al. | |
| 4,119,607 A | 10/1978 | Gergen et al. | |
| 4,172,859 A | 10/1979 | Epstein | |
| 4,264,487 A | 4/1981 | Fromuth et al. | |
| 4,327,764 A | 5/1982 | Biederman et al. | |
| 4,364,280 A | 12/1982 | Kutsay | |
| 4,564,658 A * | 1/1986 | Liu | 525/177 |
| 4,684,686 A * | 8/1987 | Hepp | 524/281 |
| 4,962,157 A | 10/1990 | Taubitz et al. | |
| 5,055,606 A | 10/1991 | Fisch et al. | |
| 5,057,622 A | 10/1991 | Chisholm et al. | |
| 5,128,404 A * | 7/1992 | Howe | 524/456 |
| 5,300,546 A | 4/1994 | Nelson et al. | |
| 5,314,948 A | 5/1994 | Pratt et al. | |
| 5,596,049 A | 1/1997 | Gallucci et al. | |
| 5,652,306 A | 7/1997 | Meyer et al. | |
| 6,066,694 A * | 5/2000 | Chisholm et al. | 525/67 |
| 6,187,848 B1 * | 2/2001 | Pixton et al. | 524/126 |
| 6,300,399 B1 * | 10/2001 | Gallucci et al. | 524/398 |

FOREIGN PATENT DOCUMENTS

| | | |
|---|---|---|
| EP | 0510120 | 5/1993 |
| EP | 0737715 | 10/1996 |
| WO | WO8700850 | 2/1987 |

\* cited by examiner

*Primary Examiner*—Jeffrey B. Robertson
(74) *Attorney, Agent, or Firm*—Marina Larson & Associates, LLC

(57) ABSTRACT

A thermoplastic resin molding composition comprising an alkylene aryl polyester, a core-shell impact modifier for enhancing heat resistance having a shell derived from an alkylacrylate and a rubbery acrylate core derived from an acrylate having 4 to 12 carbon atoms, an effective amount of a difunctional epoxy compound for enhancing hydrolysis resistance of the resin, and a combination of color enhancing stabilizers comprising a thioester stabilizer, a phosphite or phosphonite stabilizer and a hindered phenol stabilizer.

19 Claims, No Drawings

POLYESTER MOLDING COMPOSITION

FIELD OF THE INVENTION

The invention relates to a molding composition comprising an impact modified polyester resin with good retention of color, elongation and impact when aged at high temperature under wet or dry conditions.

BACKGROUND OF THE INVENTION

Moldable thermoplastic polyester crystalline resin blends offer a high degree of surface hardness, solvent resistance and abrasion resistance, high gloss, and low surface friction. However poor impact strength and limited resistance to hydrolytic breakdown can limit usefulness in some application where articles made from the polyester will be exposed to hot wet conditions.

Often a rubbery modifier is added to polyesters to improve impact strength. For example, improved impact strength is obtained by melt compounding polybutylene terephthalate with ethylene homo- and copolymers functionalized with either acid or ester moieties as taught in U.S. Pat. Nos. 3,405,198; 3,769,260; 4,327,764; and 4,364,280. Polyblends of polybutylene terephthalate with a styrene-alpha-olefin-styrene triblock are taught in U.S. Pat. No. 4,119,607. U.S. Pat. No. 4,172,859 teaches impact modification of polybutylene terephthalate with random ethylene-acrylate copolymers and EPDM rubbers grafted with a monomeric ester or acid functionality. However addition of rubbery modifiers can case other issues such as poor melt stability, reduced melt flow, lower modulus and reduced color stability when exposed to heat.

The issue of improving polyester hydrolytic stability has been addressed through use of additive such as carbodiimides as described in U.S. Pat. No. 3,193,522 and epoxy compounds as described in U.S. Pat. No. 5,596,049.

However a balance of performance wherein the polyester resin have good impact and elongation, and are resistant to loss of impact and elongation under wet and dry conditions, while showing limited color change has been difficult to achieve. Thus there exists a need for crystalline polyester compositions with good melt processability, high solvent resistance good impact and elongation and low color which retains these features when exposed to heat.

The abstract of U.S. Pat. No. 6,187,848 to Pixton et al states: "A lightly colored flame retarded reinforced polyester molding composition has color stability at relatively high temperatures and comprises (a) from 40 to 80 weight percent of a polyester resin; (b) from about 20 to about 50 weight percent fibrous glass; (d) from 2.5 to 20 weight percent of a flame retarding composition; (e) and less than about 5 percent by weight additional ingredients which include a combination of stabilizers consisting essentially of an acid quencher, a thioester and a phosphonite." In this case impact modifiers are detrimental to thermal color stability. Also the color stable compositions of Pixton do not use hindered phenol antioxidants since, as indicated by R. Gauchter and H. Muller in "Plastics Additives Handbook" 4th Ed. Hanser Publishers, p 31, hindered phenol antioxidants can cause yellowing U.S. Pat. No. 5,300,546 to Walsh relates to polyester compositions with mineral fillers giving a ceramic feel which have improved hydrolytic stability and melt viscosity stability. As set forth in column 2, lines 65 to column 3, line 2, "a thermoplastic resin composition comprising (a) a polyester resin; (b) a mono- or polyepoxy compound; and (c) mineral filler" is described. Additional ingredients are described as "(d) a catalyst compound and/or (e) a hindered phenol antioxidant." While describing improved hydrolysis resistance in highly filled polyester compositions using the epoxide additives similar to U.S. Pat. No. 5,596,049, this case does not address the question of improved impact, thermal aging and thermal color stability.

A problem with hydrolytically stabilized polyester blends is the lack of impact and the heat stability of the impact modified composition. Poor heat stability may result in discoloration and mechanical failure of a molded article. Loss of heat stability may be evidenced by a decrease in impact resistance and a shift in the coloration. It is desirable to improve heat stability and color stability without deleterious affecting the hydrolytic stability of the polyester composition. It is also important in many applications requiring impact resistance to achieve hydrolytic stability and color stability along with retention of impact and elongation. Accordingly, there is a need for enhancing the impact, as well as the retention of impact and color upon thermal aging in a hydrolytically stable polyester resin.

SUMMARY OF THE INVENTION

We have found that a very specific combination of crystalline alkylene terephthalate resin, acrylic core sell impact modifier in conjunction with a cycloaliphatic diepoxides, thioesters, hindered phenols and phosphites gives a composition with high impact and elongation, low initial color and good retention of impact and color after heat exposure under wet and dry conditions.

According to an embodiment, a thermoplastic polyester resin comprises an alkylene aryl polyester, a core-shell impact modifier for enhancing heat resistance having a shell derived from an alkylacrylate and a rubbery acrylate core derived from an acrylate having 4 to 12 carbon atoms, an effective amount of a difunctional epoxy compound for enhancing hydrolysis resistance of the resin, and a combination of color enhancing stabilizers comprising a thioester stabilizer, a phosphite or phosphonite stabilizer, and a hindered phenol stabilizer.

DETAILED DESCRIPTION OF PREFERRED EMBODIMENTS

Polyester

The term alkylene aryl polyester refers to crystalline thermoplastic polyesters such as polyesters derived from an aliphatic or cycloaliphatic diols, or mixtures thereof, containing from 2 to about 10 carbon atoms and at least one aromatic dicarboxylic acid. Preferred polyesters are derived from an aliphatic diol and an aromatic dicarboxylic acid having repeating units of the following general formula:

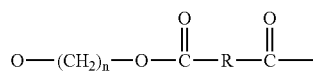

wherein n is an integer of from 2 to 6. R is a $C_6$–$C_{20}$ aryl radical comprising a decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, 4,4' bisbenzoic acid and mixtures thereof. All of these acids contain at least one aromatic nucleus. Acids containing fused rings can also be present, such as in 1,4-1,5- or 2,6-naphthalenedicarboxylic acids. The preferred dicarboxylic acids are terephthalic acid, isophthalic acid, naphthalene dicarboxylic acid or mixtures thereof.

The most preferred polyesters are poly(ethylene terephthalate) ("PET"), and poly(1,4-butylene terephthalate), ("PBT"), poly(ethylene naphthanoate) ("PEN"), poly(butylene naphthanoate), ("PBN") poly(propylene terephthalate) ("PPT") and poly(cyclohexane dimethanol terephthalate), (PCT).

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mol %, preferably at least 80 mol %, of which consists of tetramethylene glycol and an acid component at least 70 mol %, preferably at least 80 mol %, of which consists of terephthalic acid, or polyester-forming derivatives therefore.

The polyesters used herein have an intrinsic viscosity of from about 0.4 to about 2.0 dl/g as measured in a 60:40 phenol/tetrachloroethane mixture or similar solvent at 23°–30° C. VALOX 315 polyester is particularly suitable for this invention having an intrinsic viscosity of 1.1 to 1.4 dl/g.

A mixture of polyester resins with differing viscosities may be used to make a blend mixture to allow for better control of the viscosity of the final formulation.

Blends of polyesters may also be employed in the composition. As indicated earlier, preferred polyester blends are made from poly(ethylene terephthalate) and poly(1,4-butylene terephthalate).

Acrylic Modifer

The composition comprises an impact modifier, preferably a core-shell polymers built up from a rubber-like core on which one or more shells have been grafted. Typical core material consists substantially of an acrylate rubber. Preferable the core is an acrylate rubber of derived from a C4 to C12 acrylate. Typically, one or more shells are grafted on the core. Usually these shells are built up for the greater part from a vinyl aromatic compound and/or a vinyl cyanide and/or an alkyl(meth)acrylate and/or (meth)acrylic acid. Preferable the shell is derived from an alkyl(meth)acrylate, more preferable a methyl(meth)acrylate. The core and/or the shell(s) often comprise multi-functional compounds that may act as a cross-linking agent and/or as a grafting agent. These polymers are usually prepared in several stages. The preparation of core-shell polymers and their use as impact modifiers in combination with polycarbonate are described in U.S. Pat. Nos. 3,864,428 and 4,264,487. Especially preferred grafted polymers are the core-shell polymers available from Rohm & Haas under the trade name PARALOID®, including, for example, PARALOID® EXL3691 and PARALOID® EXL3330 and EXL2300.

In another aspect of the invention the acrylic core shell rubber comprises a multi-phase composite interpolymer comprising about 25 to 95 weight percent of a first acrylic elastomeric phase polymerized from a monomer system comprising about 75 to 99.8% by weight $C_1$ to $C_{14}$ alkyl acrylate, 0.1 to 5% by weight crosslinking member, 0.1 to 5% by weight graftlinking monomer, said crosslinking monomer being a polyethylenically unsaturated monomer having a plurality of addition polymerizable reactive groups and about 75 to 5 weight percent of a final, rigid thermoplastic acrylic or methacrylic phase polymerized in the presence of said elastomer.

Preferred impact modifiers include core-shell impact modifiers, such as those having a core of poly(butyl acrylate) and a shell of poly(methyl methacrylate).

A useful amount of impact modifier is about 1 to about 30 weight percent, preferably about 5 to about 15 weight percent, more preferably about 6 to about 12 weight percent, wherein the weight percentages are based on the entire weight of the composition.

Core shell acrylic rubbers can be of various particle sizes. The preferred range is from 300–800 nm, however larger particles, or mixtures of small and large particles, may also be used. In some instances, especially where good appearance is required acrylic rubber with a particle size of 350–450 nm may be preferred. In other applications where higher impact is desired acrylic rubber particle sizes of 450–550 nm or 650–750 nm may be employed.

Epoxy

The resin blend includes an effective amount of at least one difunctional epoxy compound. The preferred difunctional polyepoxy compound is 3,4-epoxycyclohexylmethyl-3,4-epoxycyclohexane carboxylate. The preferred catalysts are salts of aliphatic or aromatic carboxylic acids.

By difunctional epoxy compound is meant a compound having two terminal epoxy functionalities. Preferably the compound will contain only carbon, hydrogen and oxygen. The compound will preferably have a molecular weight of below about 1000 to facilitate blending with the polyester resin.

Preferred difunctional epoxy compounds will have at least one of the epoxide groups on a cyclohexane ring. Examples of preferred difunctional epoxy compounds are 3,4-epoxy-cyclohexylmethyl-3,4-epoxycyclohexane carboxylate, bis (3,4-epoxycyclohexyl) adipate, vinylcyclohexene di-epoxide, epoxy cyclohexane adducts of carboxylic acids and the like. Especially preferred is 3,4-epoxycyclohexylmethyl-3,4-epoxycyclohexane carboxylate.

The difunctional epoxide compounds can be made by techniques well known to those skilled in the art. For example, the corresponding alpha, beta.-dihydroxy compounds can be dehydrated to produce the epoxide groups, or the correspondingly unsaturated compounds can be epoxidized by treatment with a peracid, such as peracetic acid, in well-known techniques. The compounds are also commercially available.

The difunctional epoxy compound may be employed in any effective amount, but preferably small amounts are use, e.g., at a range of about 0.1 to about 5 percent by weight. However, a particularly preferred range is from about 0.1 to about 3.5 percent by weight. A more preferred range is from about 0.5 to about 2 percent by weight. Within this particularly preferred range it has been found advantageous to employ in certain compositions from about 1 to about 2.0 percent by weight of the difunctional polyepoxy compound. All percentages are based on the total weight of the blend.

Another optional component of the present invention consists of the catalyst compound. Preferred catalysts are salts free from direct carbon-phosphorus bonds and containing at least one of alkali metal cations and halide anions. It is apparent that this class contains a large number of compounds. They include alkali metal halides, alkali metal carboxylates, and alkali metal carbonates and bicarbonates.

Illustrative compounds within this class are lithium fluoride, lithium iodide, potassium bromide, potassium iodide, sodium acetate, sodium benzoate, sodium caproate, sodium stearate, and potassium oleate.

The catalyst component can be present in the composition of the present invention in any effective amount. Preferably the catalyst is present in an amount ranging from about 0.01 to about 1 weight percent, more preferably from about 0.03 to about 0.1 weight percent based on the total weight of the resin composition.

Stabilizer—Thioester

The stabilizer package employed for enhancing color stability desirable utilizes three components: a thioester, a phosphonite or phosphite, and a sterically hindered phenol.

The thioester stabilizer is the type having a sulfur linkage and a carboxylic acid or ester linkage separated by a divalent alkyl group and comprising the following structures.

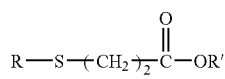

wherein R is alkyl and R' is alkyl or hydrogen, preferably alkyl is $C_1$ to $C_{30}$. Such thioesters are referred to in U.S. Pat. No. 5,057,622 to Chisholm et al.

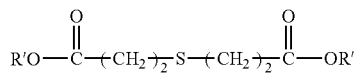

wherein R' is as above, either same or different, and with R' preferably being $C_{12}$–$C_{18}$ alkyl.

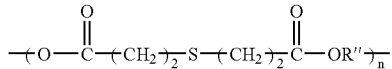

wherein R" is $C_2$–$C_{10}$ diol residue or a polyethylene glycol, polypropylene glycol or polybutylene glycol residue, and n is from 1 to 10.

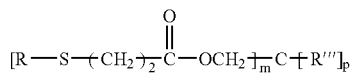

is a most preferred structure with R being alkyl and R''' being alkyl, alkoxy or carboalkoxy, with m+p=4, and most preferably, m=4. Such structures are referred to in U.S. Pat. No. 5,055,606 to Fisch et al.

Thioester/acid stabilizers typically have molecular weights from about 200 to about 2000. Typical thioester stabilizers are dilauryl thiodipropionate (bis-dodecyl 3,3'-thiodipropionate), distearyl thiodipropionate (bis-octadecyl 3,3'-thiodipropionate), dimyristyl thiodipropionate, ditridecyl thiodipropionate, mixed esters (lauryl and stearyl) of thiodipropionic acid, and pentaerythritol tetrakis(3-(dodecylthio)propionate). Also preferred thioesters are esters of di-, tri- or tetra-carboxylic acids. Most preferred is pentaerythritol tetrakis(3-(dodecylthio)propionate), which is sold by Crompton as SEENOX 412-S, due to its good stability, low volatility and low odor. Thioesters with low odor are preferred.

Preparation of suitable alkyl thio propionic esters is described in U.S. Pat. No. 5,055,606 and 5,057,622.

Stabilizer—Phosphite or Phosphonite

Typical phosphonite stabilizers have one of the P bonds attached directly to an aryl radical. Examples of such compounds are presented in U.S. Pat. No. 4,075,163. Suitable compounds may be represented by the phosphonite formula:

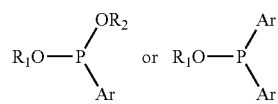

where $R_1$, $R_2$ is alkyl, aryl, alkylaryl, alkyl substituted, preferably an aryl group of 6 to 30 carbon atoms or an alkyl of 1 to 30 carbon atoms, and Ar is an aryl group for example phenyl, naphthyl, biphenyl, terphenyl, etc. The preferred phosphonites are difunctional containing two phosphonite groups bonded to the aryl group, see formula below:

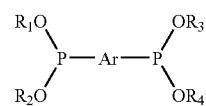

wherein $R_1$, $R_2$, $R_3$, $R_4$ are the same as previously discussed and can be the same or different. More preferred are aryl phosphonites where R1, R2, R3, R4 are derived from alkylated phenols and the Ar group is derived from biphenyl. Most preferred phosphonite is tetrakis(2,4-di-tert-butylphenyl)4,4'-biphenylene diphosphonite (SANDOSTAB PEPQ from Clariant Chemicals).

Typical phosphite stabilizers include tri-aryl phosphite stabilizers of the following formula:

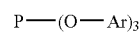

Phosphites and phosphonites, for example, include triphenyl phosphite, diphenylalkyl phosphites, phenyldialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite tristearyl sorbitol triphosphite, and tetrakis(2,4-di-tert-butylphenyl)-4,4'-biphenylene diphosphonite.

Stabilizer—Hindered Phenol

The sterically hindered phenols that are useful in the practice of the present invention are preferably selected from the group consisting of hindered phenols having a molecular weight above 500 Daltons. Preferred examples include 2,4-dimethyl-6-octyl-phenol; 2,6-di-t-butyl-4-methyl phenol (i.e., butylated hydroxy toluene); 2,6-di-t-butyl-4-ethyl phenol; 2,6-di-t-butyl-4-n-butyl phenol; 2,2'-methylenebis(4-methyl-6-t-butyl phenol); 2,2'-methylenebis(4-ethyl-6-t-butyl phenol); 2,4-dimethyl-6-t-butyl phenol; 4-hydroxymethyl-2,6-di-t-butyl phenol; n-octadecyl-beta(3,5-di-t-butyl-4-hydroxyphenol) propionate; 2,6-dioctadecyl-4-methyl phenol; 2,4,6-trimethyl phenol; 2,4,6-triisopropyl phenol; 2,4,6-tri-t-butyl phenol; 2-t-butyl-4,6-dimethyl phenol; 2,6-methyl-4-didodecyl phenol; tris(3,5-di-t-butyl-4-hydroxy isocyanurate, and tris(2-methyl4-hydroxy-5-t-butylphenyl)butane.

More preferred are octadecyl-3,5-di-t-butyl-4-hydroxy hydrocinnamate (NAUGARD 76, Uniroyal Chemical; IRGANOX 1076, Ciba-Geigy); tetrakis(methylene(3,5-di-t-butyl-4-hydroxy-hydrocinnamate)}methane (NAUGARD 10, Uniroyal Chemical; IRGANOX 1010, Ciba-Geigy); 1,2-bis(3,5-di-t-butyl-4-hydroxyhydrocinnamoyl)hydrazine (IRGANOX MD 1024, Ciba-Geigy); 1,3,5-tris(3,5-di-t-butyl-4-hydroxybenzyl)-s-triazine-2,4,6(1H,3H, 5H)trione (IRGANOX 3114, Ciba-Geigy); 1,3,5-tris(4-t-butyl-3-hydroxy-2,6-dimeththylbenzyl)-s-triazine -2,4,6-(1H,3H,5H) trione (CYANOX 1790, American Cyanamid Co.); 1,3,5-trimethyl-2,4,6-tris(3,5-di-t-butyl-4-hydroxybenzyl) benzene (ETHANOX 330, Ethyl Corp.); 3,5-di-t-butyl-4-hydroxyhydrocinnamic acid triester with 1,3,5-tris(2-hydroxyethyl)-5-triazine-2,4,6(1H,3H,5H)-trione, and bis(3,3-bis(4-hydroxy-3-t-butylphenyl)butanoic acid)glycolester.

Most preferred are the hindered phenols having molecular weights above 700, especially polyphenols that contain three or more substituted phenol groups, such as tetrakis{methylene(3,5-di-t-butyl-4-hydroxy-hydrocinnamate)}methane and 1,3,5-trimethyl-2,4,6-tris(3,5-di-t-butyl-4-hydroxybenzyl)benzene.

The combined amounts of the thioester stabilizer, phosphite or phosphonite, and hindered phenol incorporated into the thermoplastic resins of the present invention will at a minimum be that required to impart a significant level of stability against oxidative degradation. In general, such amounts can vary from about 0.01 to about 5.0 weight percent, and preferably from about 0.1 to about 1.0 weight percent, of the thermoplastic resin blend. Although combined amounts of the antioxidants in excess of about 10 weight percent can be employed, such amounts may have a deleterious effect on the physical and mechanical properties of the polymeric substrate, in which case they should be avoided ordinarily.

Fillers

Additionally, it may be desired to employ inorganic fillers to the thermoplastic resin provided the favorable properties are not deleteriously affected. Typical inorganic fillers include: alumina, amorphous silica, anhydrous alumino silicates, mica, wollastonite, clays, talc, metal oxides such as titanium dioxide, zinc sulfide, ground quartz, and the like. Low levels (0.1–10.0 wt. %) of very small particle size (largest particles less than 10 microns in diameter) are preferred.

Fiber Additives

The polyester resins of the invention may be further blended with reinforcements, fillers and colorants.

Reinforcing fiber and fillers may comprise from about 5 to about 50 weight percent of the composition, preferably from about 10 to about 35 weight percent based on the total weight of the composition. The preferred reinforcing fibers are glass, ceramic and carbon and are generally well known in the art, as are their methods of manufacture.

In one embodiment, glass is preferred, especially glass that is relatively soda free. Fibrous glass filaments comprised of lime-alumino-borosilicate glass, which is also known as "E" glass are often especially preferred. Glass fiber is added to the composition to greatly increase the flexural modulus and strength, albeit making the product more brittle. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6–20 microns are required with a diameter of from 10–15 microns being preferred. In preparing the molding compositions it is convenient to use the fiber in the form of chopped strands of from about ⅛" to about ½" long although roving may also be used. In articles molded from the compositions, the fiber length is typically shorter presumably due to fiber fragmentation during compounding of the composition. The fibers may be treated with a variety of coupling agents to improve adhesion to the resin matrix. Preferred coupling agents include; amino, epoxy, amide or mercapto functionalized silanes. Organo metallic coupling agents, for example, titanium or zirconium based organo metallic compounds, may also be used.

Other preferred sizing-coated glass fibers are commercially available from Owens Corning Fiberglass as, for example, OCF K filament glass fiber 183F Other fillers and reinforcing agents may be used in alone or in combination with reinforcing fibers. These include but are not limited to: carbon fibrils, mica, talc, barite, calcium carbonate, wollastonite, milled glass, flaked glass, ground quartz, silica, zeolites, and solid or hollow glass beads or spheres.

The glass fibers may be blended first with the aromatic polyester and then fed to an extruder and the extrudate cut into pellets, or, in a preferred embodiment, they may be separately fed to the feed hopper of an extruder. In a highly preferred embodiment, the glass fibers may be fed downstream in the extruder to minimize attrition of the glass. Generally, for preparing pellets of the composition set forth herein, the extruder is maintained at a temperature of approximately 480° F. to 550° F. The pellets so prepared when cutting the extrudate may be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

Other Additives

The composition of the present invention may include additional components that do not interfere with the previously mentioned desirable properties but enhance other favorable properties such as antioxidants, colorant, including dyes and pigments, lubricants, mold release materials, nucleants or ultra violet (UV) stabilizers. Examples of lubricants are alkyl esters, for example pentaerythritol tetrastearate, alkyl amides, such as ethylene bis-stearamide, and polyolefins, such as polyethylene.

Flame-retardant additives are desirably present in an amount at least sufficient to reduce the flammability of the polyester resin, preferably to a UL94 V-0 rating. The amount will vary with the nature of the resin and with the efficiency of the additive. In general, however, the amount of additive will be from 2 to 30 percent by weight based on the weight of resin. A preferred range will be from about 15 to 20 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bistetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

The flame retardants are typically used with a synergist, particularly inorganic antimony compounds. Such compounds are widely available or can be made in known ways. Typical, inorganic synergist compounds include $Sb_2O_5$, $SbS_3$, sodium antimonate and the like. Especially preferred is antimony trioxide ($Sb_2O_3$). Synergists, such as antimony oxides, are typically used at about 0.5 to 15 by weight based on the weight percent of resin in the final composition.

Also, the final composition may contain polytetrafluoroethylene (PTFE) type resins or copolymers used to reduce dripping in flame retardant thermoplastics.

In one embodiment of the invention a thermoplastic polyester resin molding composition comprises an alkylene aryl polyester, a core-shell impact modifier for enhancing heat resistance having a shell derived from an alkylacrylate and a rubbery acrylate core derived from an acrylate having 4 to 12 carbon atoms, an effective amount of a difunctional epoxy compound for enhancing hydrolysis resistance of the resin, and a combination of color enhancing stabilizers comprising a thioester stabilizer, a phosphite or phosphonite stabilizer and a hindered phenol stabilizer, has a color change of less than about 20 delta E units, as measured by CIELab method of ASTM D2244, after heating in air at 155° C. for 21 days.

In another embodiment of the invention a thermoplastic polyester resin molding composition comprises an alkylene aryl polyester, a core-shell impact modifier for enhancing heat resistance having a shell derived from an alkylacrylate and a rubbery acrylate core derived from an acrylate having 4 to 12 carbon atoms, an effective amount of a difunctional epoxy compound for enhancing hydrolysis resistance of the resin, and a combination of color enhancing stabilizers comprising a thioester stabilizer, a phosphite or phosphonite stabilizer and a hindered phenol stabilizer has a tensile elongation at break greater than 10%, as measured by ASTM D638 after heating in air at 155° C. for 21 days.

In another aspect of the invention a thermoplastic molding composition comprising the following is preferred;

(a) 60–98% alkylene terephthalate
(b) 1–30% acrylic rubber core shell impact modifier
(c) 0.1–5.0% dicycloaliphatic epoxide
(d) 0.1–2.0% phosphite or phosphonite
(e) 0.1–2.0% hindered phenol
(f) 0.1–2.0% thioester
(g) 0–1.0% alkali carboxylate salt
(h) 0.1–2.0% polyester, polyamide or polyolefin mold release The blends of the invention may be formed into shaped articles by a variety of common processes for shaping molten polymers such as injection molding, compression molding, extrusion and gas assist injection molding. Examples of such articles include electrical connectors, enclosures for electrical equipment, automotive engine parts, lighting sockets and reflectors, electric motor parts, power distribution equipment, communication equipment and the like including devices that have molded in snap fit connectors. The impact modified polyester resins can also be made into film and sheet.

EXAMPLES

The following examples illustrate the present invention, but are not meant to be limitations to the scope thereof. Examples of the invention are designated by numbers, comparative examples are shown by letters. The examples of Tables 2 & 3 were all prepared and tested in a similar manner:

The ingredients of the examples shown below in Tables 2 & 3, were tumble blended and then extruded on a 30 mm Werner Pfleiderer Twin Screw Extruder with a vacuum vented mixing screw, at a barrel and die head temperature between 240 and 265 degrees C. and 300 rpm screw speed. The extrudate was cooled through a water bath prior to pelletizing. Test parts were injection molded on a van Dorn molding machine with a set temperature of approximately 240 to 265° C. The pellets were dried for 3–4 hours at 120° C. in a forced air circulating oven prior to injection molding.

Tensile elongation at break was tested on 7×⅛ in. injection molded bars at room temperature with a crosshead speed of 2 in./min. using ASTM method D648.

Notched Izod testing as done on 3×½×⅛ inch bars using ASTM method D256. Bars were notched prior to oven aging, samples were tested at room temperature.

A set of 10 molded 5×½×⅛ inch bars were aged in an air circulating oven at. The bars were then tested for flexural properties as per ASTM 790. The number of bars that broke with less than 5% flexural strain was recorded. The number of bars that were not broken at 5% strain after being aged at either a 155 or 185° C. was monitored and recorded as % unbroken bars; 100% indicates no bars broke, 50% indicates half the bars broke, 0% indicates all bars of a given formulation broke.

Biaxial impact testing, sometimes referred to as instrumented impact testing, was done as per ASTM D3763 using a 4×⅛ inch molded discs. The total energy absorbed by the sample is reported as ft-lbs. Testing was done at room temperature on as molded or oven aged samples.

Molded color plaques were heat aged in air in a forced air circulating oven at 155 or 185° C. Color chips were removed from the oven at various time intervals and cooled to room temperature. Chip color was measured on a ACS CS-5 ChromoSensor in reflectance mode with a D65 illuninant source, a 10 degree observer, specular component included, CIE color scale as described in "Principles of Color Technology" F. W. Billmeyer and M. Saltzman/John Wiley & Sons, 1966. The instrument was calibrated immediately prior to sample analysis against a standard white tile. The color values reported below are the difference before and after heat aging. The color change is expressed as ΔE (delta E). Testing was done as per ASTM D2244.

Oven aging was done by placing molded parts in an air circulating oven at 155 or 185° C. for several days. Parts were removed from the oven, allowed to cool and equilibrate at 50% relative humidity for at least two days before testing. Oven aging was done as per ASTM D3045.

The impact modifier used was a core-shell acrylic rubber. The impact modifier comprised a butyl acrylate (or derivatives thereof) core grafted to a poly(methyl methacrylate) shell. These pellets were obtained from Rohm and Haas under the trade name PARALOID® as PARALOID® 3330 or EXL3330. EXL3330 is a pelletized form of the powder acrylic rubber EXL2330. The acrylic modifier was made by an emulsion polymerization similar to that described in U.S. Pat. No. 3,808,180. It has an average particle size of about 600 nm. The stabilizer was obtained from Ciba Geigy under the trade name IRGAPHOS® as IRGAPHOS® 168, which is a tris di-t-butyl phenyl phosphite.

The antioxidant used was obtained from Ciba Geigy under the trade name IRGANOX® as IRGANOX® 1010. This antioxidant is a tetra functional 2,6-di-tert butyl hindered phenol.

ERLepoxide;3,4-epoxycyclohexylmethyl-3,4-epoxycyclohexane carboxylate (ERL4221 from Union Carbide Co.). In this blend the di-epoxide is thought to react with polyester acid end groups to reduce acidity and improve resistance to polyester breakdown by hydrolysis. It is also thought that the sodium stearate (NaSt) is added as a catalyst to enhance capping of the polyester with the di-epoxide during melt processing PETS is pentaerythritol tetra stearate, a mold release. SEENOX® 412 is a tetra functional thio-ester antioxidant from Crompton Co. It is the tetra ester of pentaerythritol and 3-dodceylthioproprionic acid.

Table 1 shows the ingredients used in the blends discussed in the comparative examples (designated by letters) and the examples of the invention (designated by numbers).

TABLE 1

Test Materials

| Abbreviation | Material |
|---|---|
| PBT 195 | Poly(1,4-butylene terephthalate) Mw ~21,000 from GE Plastics |
| PBT 315 | Poly(1,4-butylene terephthalate) Mw ~37,000 from GE Plastics |
| 412S | Thioester, Pentaerythritol tetrakis(3-(dodecylthio) propionate) sold as SEENOX 412-S from Crompton |
| AO1010 | Hindered Phenol, Pentaerythritol tetrakis(3,5-di-tert-butyl-4-hydroxyhydrocinnamate) sold as IRAGANOX 1010 from Ciba Geigy |
| AO168 | Phosphite, 2,4-di-tert-butylphenol phosphite (3:1) sold as IRGAPHOS 168 from Ciba Geigy |
| ERL4221 | 3,4-epoxycyclohexylmethyl-3-4-epoxy-cyclohexyl carboxylate from Union Carbide Co. |
| NaSt | Sodium Stearate |
| PETS | pentaerythritol tetrastearate |
| MBS | Methacrylate-Butadiene-Styrene emulsion copolymer impact modifier with core-shell structure. From Rohm & Haas EXL2691 |
| Acrylic Rubber | Acrylic impact modifier from Rohm and Haas EXL3330 Emulsion copolymer of methacrylate-butyl acrylate with core-shell structure. |

Examples A–C & 1

Testing of injection molded parts was done in an air circulating oven. The composition of the blends and test results are shown in Table 2. Comparative examples A and B show high color formation and loss of impact during aging at 155° C. These examples use a MBS rubber. Use of a methylmethacrylate butylacrylate core shell acrylic rubber (EXL3330 from Rohm and Hass Co.), in examples C & 1 gives much better color and impact retention on oven aging in air at 155° C. Example 1 using the acrylic rubber with a combination of three stabilizers: thioester, hindered phenol and phosphite antioxidants gives preferred color and impact retention. Note that use of the same stabilizer combination with the MBS (example B) rubber does not give good color and impact retention (compare examples B and 1 in Table 2).

TABLE 2

Aging at 155° C.

| | EXAMPLE | | | |
|---|---|---|---|---|
| | A | B | C | 1 |
| PBT 315 | 29.8 | 29.5 | .8 | 30.4 |
| PBT 195 | 58.19 | 58.19 | 58.19 | 59.3 |
| MBS EXL2691 | 10.0 | 10.0 | 0 | 0 |
| Acrylic Rubber EXL3330 | 0 | 0 | 10 | 8 |
| ERL4221 | 1.50 | 1.50 | 1.50 | 1.50 |
| PETS | 0.2 | 0.2 | 0.2 | 0.2 |
| NaSt | 0.05 | 0.05 | 0.05 | 0.05 |
| AO1010 | 0.06 | 0.20 | 0.06 | 0.20 |
| 412S | 0.20 | 0.20 | 0.20 | 0.20 |
| AO168 | 0 | 0.20 | 0 | 0.20 |
| Color vs. as molded | | | | |
| delta E (155° C., 3 days) | 12.8 | 6.4 | 5.3 | 5.2 |
| delta E (155° C., 7 days) | 55.0 | 26.9 | 9.9 | 7.1 |
| delta E (155° C., 14 days) | 60.0 | 59.8 | 36.0 | 8.5 |
| delta E (155° C., 21 days) | 60.0 | 60.0 | 41.0 | 12.7 |
| delta E (155° C., 36 days) | 62.0 | 62.0 | 43.0 | 16.0 |
| Biaxial impact Total Energy ft-lb | | | | |
| 3 days at 155° C. | 42 | 43 | 40 | 46 |
| 7 days at 155° C. | 21 | 40 | 11 | 51 |
| 14 days at 155° C. | 1 | 23 | 17 | 20 |
| 21 days at 155° C. | 1 | 1 | 4 | 21 |
| 36 days at 155° C. | 1 | 1 | 2 | 11 |
| % Tensile Elong. | | | | |
| 0 days at 155° C. | 95 | 94 | 84 | 106 |
| 3 days at 155° C. | 9 | 28 | 39 | 37 |
| 7 days at 155° C. | 5 | 7 | 43 | 35 |
| 14 days at 155° C. | 3 | 3 | 33 | 31 |
| 36 days at 155° C. | 2 | 2 | 4 | 19 |
| % Unbroken aged parts, ≥5% strain | | | | |
| 0 days at 155° C. | 100% | 100% | 100% | 100% |
| 3 days at 155° C. | 100% | 100% | 100% | 100% |
| 7 days at 155° C. | 0% | 50% | 100% | 100% |
| 14 days at 155° C. | 0% | 0% | 100% | 100% |
| 36 days at 155° C. | 0% | 0% | 0% | 100% |
| N. Izod ft-lb/in | | | | |
| 0 days at 155° C. | 2.5 | 2.3 | 2.3 | 2.4 |
| 3 days at 155° C. | 1.8 | 1.8 | 2.0 | 1.5 |
| 7 days at 155° C. | 1.4 | 1.5 | 1.8 | 1.5 |
| 14 days at 155° C. | 1.4 | 1.5 | 1.8 | 1.5 |
| 36 days at 155° C. | 0.3 | 0.6 | 1.4 | 1.1 |

Examples D–I & 2

The blends shown in Table 2 were extruded, molded, oven aged and tested. Example 2 and comparative example D-I shown in Table 2 show the need for all three stabilizers, thioester, hindered phenol and phosphite in combination with the acrylic rubber to give the best retention of properties and least color change on aging in air at 185° C. Examples D, E & F show that each individual stabilizer, even when used at 3 times the level of the example 2, is deficient in either retarding color formation or preventing loss of impact. Examples E, F & H fail to retain elongation, or show breakage of parts under 5% strain, after aging. Example D, E, F, G, H and I all develop more color on aging than example 2 with examples D and E showing the most color change on aging samples.

Examples G, H & I using combination of only two stabilizers likewise give more change in color on thermal aging. Absence of the hindered phenol, AO1010, is especially detrimental to retention of elongation (examples E, F & H). It is surprising that the hindered phenol in example 2 in not detrimental to color as hindered phenols are know to yellow in thermal aging.

TABLE 3

Aging at 185° C.

| | Examples | | | | | | |
|---|---|---|---|---|---|---|---|
| | 2 | D | E | F | G | H | I |
| PBT 315 | 40.0 | 40.0 | 40.0 | 40.0 | 40.0 | 40.0 | 40.0 |
| PBT 195 | 49.65 | 49.65 | 49.65 | 49.65 | 49.65 | 49.65 | 49.65 |
| EXL3330 | 8 | 8 | 8 | 8 | 8 | 8 | 8 |
| PETS | 0.2 | 0.2 | 0.2 | 0.2 | 0.2 | 0.2 | 0.2 |
| ERL4221 | 1.5 | 1.5 | 1.5 | 1.5 | 1.5 | 1.5 | 1.5 |
| NaSt | 0.05 | 0.05 | 0.05 | 0.05 | 0.05 | 0.05 | 0.05 |
| AO1010 | 0.2 | 0.6 | 0.0 | 0.0 | 0.3 | 0.0 | 0.3 |
| SEENOX (412S) | 0.2 | 0.0 | 0.6 | 0.0 | 0.3 | 0.3 | 0.0 |
| AO168 | 0.2 | 0.0 | 0.0 | 0.6 | 0.0 | 0.3 | 0.3 |
| % Elong. @ break | | | | | | | |
| 0 days at 185° C. | 93 | 83 | 98 | 87 | 94 | 90 | 101 |
| 5 days at 185° C. | 20 | 24 | 2 | 2 | 16 | 2 | 11 |
| % Unbroken aged parts, ≧5% strain | | | | | | | |
| 5 days at 185° C. | 100% | 100% | 50% | 0% | 100% | 0% | 100% |
| Color-delta E | | | | | | | |
| 0 days at 185° C. | 0 | 0 | 0 | 0 | 0 | 0 | 0 |
| 1 day at 185° C. | 10 | 19 | 10 | 9 | 9 | 8 | 13 |
| 4 days at 185° C. | 15 | 30 | 31 | 20 | 20 | 22 | 23 |

Hydrolysis Testing

Tensile bars molded of the composition of example 1 were suspended in a pressure cooker with water and exposed to steam at 110° C., 100% Relative Humidity (RH). Samples were analyzed for retention of tensile strength at yield and % elongation at break. Table 4 shows that the resin of Example 1 showed almost complete retention of tensile strength after 6 days and still had elongation above 20%,

TABLE 4

Hydrolysis Testing Example

| Days @ 110° C./ 100% RH | T. Strength Kpsi | % Elong. |
|---|---|---|
| As Molded | 6.9 | 105 |
| 2 Days | 6.5 | 68 |
| 4 Days | 6.6 | 49 |
| 6 Days | 6.6 | 27 |

The invention claimed is:

1. A thermoplastic polyester resin molding composition comprises an alkylene aryl polyester, a core shell impact modifier for enhancing heat resistance having a shell derived from an alkylacrylate and a rubbery acrylate core derived from an acrylate having 4 to 12 carbon atoms, an effective amount of a difunctional epoxy compound for enhancing hydrolysis resistance of the resin, and a combination of color enhancing stabilizers comprising a thioester stabilizer, a phosphite stabilizer and a hindered phenol stabilizer.

2. A thermoplastic molding composition of claim 1 comprising the following;
    (a) 60–98% alkylene terephthalate
    (b) 1–30% acrylic rubber core shell impact modifier
    (c) 0.1–5.0% dicycloaliphatic epoxide
    (d) 0.1–2.0% phosphite
    (e) 0.1–2.0% hindered phenol
    (f) 0.1–2.0% thioester
    (g) 0–0.1% alkali carboxylate salt
    (h) 0.1–2.0% polyester, polyamide or polyolefin mold release.

3. A thermoplastic resin composition according to claim 1 having repeating units of the following general formula:

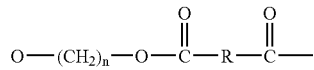

where n is an integer of from 2 to 6 and R is a $C_6$–$C_{20}$ aryl radical comprising a decarboxylated residue derived from an aromatic dicarboxylic acid.

4. A thermoplastic resin composition according to claim 3 wherein the alkylene aryl polyester is selected from the group consisting of poly(ethylene terephthalate), poly(propylene terephthalate), poly(cyclohexane dimethanol terephthalate), poly(butylene terephthalate) and mixtures thereof.

5. A composition of claim 1 wherein said thioester stabilizer is the type having a sulfur linkage and an ester linkage separated by a divalent alkyl group having a formula:

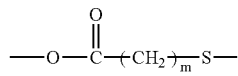

where m is from 1 to 5.

6. A composition of claim 5 wherein the thioester stabilizers comprise pentaerythritol tetrakis (3-(dodecylthio)propionate).

7. A composition of claim 1 wherein said phosphite is represented by the phosphite formula:

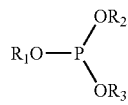

where at least one of $R_1$, $R_2$ and $R_3$ is an aryl radical of 6 to 30 carbon atoms and any other(s) of $R_1$, $R_2$, and $R_3$ are H or alkyl of 1 to 30 carbon atoms.

8. A composition of claim 1 wherein the acrylic rubber has a particle size of from 300 to 800 nm.

9. A thermoplastic resin composition according to claim 1 wherein said acrylic core shell rubber comprises a multiphase composite interpolymer comprising about 25 to 95 weight percent of a first acrylic elastomeric phase polymerized from a monomer system comprising about 75 to 99.8% by weight $C_1$ to $C_{14}$ alkyl acrylate, 0.1 to 5% by weight crosslinking monomer, 0.1 to 5% by weight graftlinking monomer, said crosslinking monomer being a polyethylenically unsaturated monomer having a plurality of addition polymerizable reactive groups and about 75 to 5 weight percent of a final, rigid thermoplastic acrylic or methacrylic phase polymerized in the presence of said elastomer.

10. A thermoplastic resin composition according to claim 1 wherein said difunctional epoxy compound said at least one difunctional epoxy compound having at least one cyclohexane ring moiety and having two terminal epoxy functional groups, wherein at least one of the two terminal epoxy functional groups is a substituent on at least one cyclohexane ring moiety; and an effective amount of a catalyst compound.

11. A thermoplastic resin composition according to claim 10 wherein at least one difunctional epoxy compound is selected from the group consisting of bis(3,4-epoxycyclohexylmethyl) adipate; vinylcyclohexene diepoxide; 3,4-epoxycyclohexylmethyl-3,4-epoxycyclohexylcarboxylate and mixtures of any of the foregoing.

12. A composition as defined in claim 10 wherein said catalyst compound is selected from the group consisting of alkaline metal halides, carboxylates, carbonates and bicarbonates and mixtures thereof.

13. A composition as defined in claim 12 wherein said catalyst component comprises alkaline metal salts of an alkyl or aromatic carboxylic acid.

14. A composition as defined in claim 10 wherein said catalyst compound is present in an amount ranging from about 0.001 to about 1 weight percent based on the total weight of the composition.

15. A thermoplastic resin composition according to claim 1 further comprising a fibrous glass reinforcement in an amount from about 3 to 50 pbw of the total composition.

16. A composition of claim 1 wherein a color change of less than about 20 delta E units, as measured by CIELab method of ASTM D2244 after heating in air at 155° C. for 21 days.

17. A composition of claim 1 wherein elongation at break is greater than 10%, as measured by ASTM D638 after heating in air at 155° C. for 21 days.

18. An article made from the composition of claim 1.

19. An article of claim 18 selected from the group consisting of: electrical connectors, enclosures for electrical equipment, automotive engine parts, lighting sockets and reflectors, electric motor parts, power distribution equipment and communication equipment.

* * * * *